Oct. 28, 1930.  J. G. WHITE  1,779,895
ELEVATOR LINK
Filed May 8, 1928
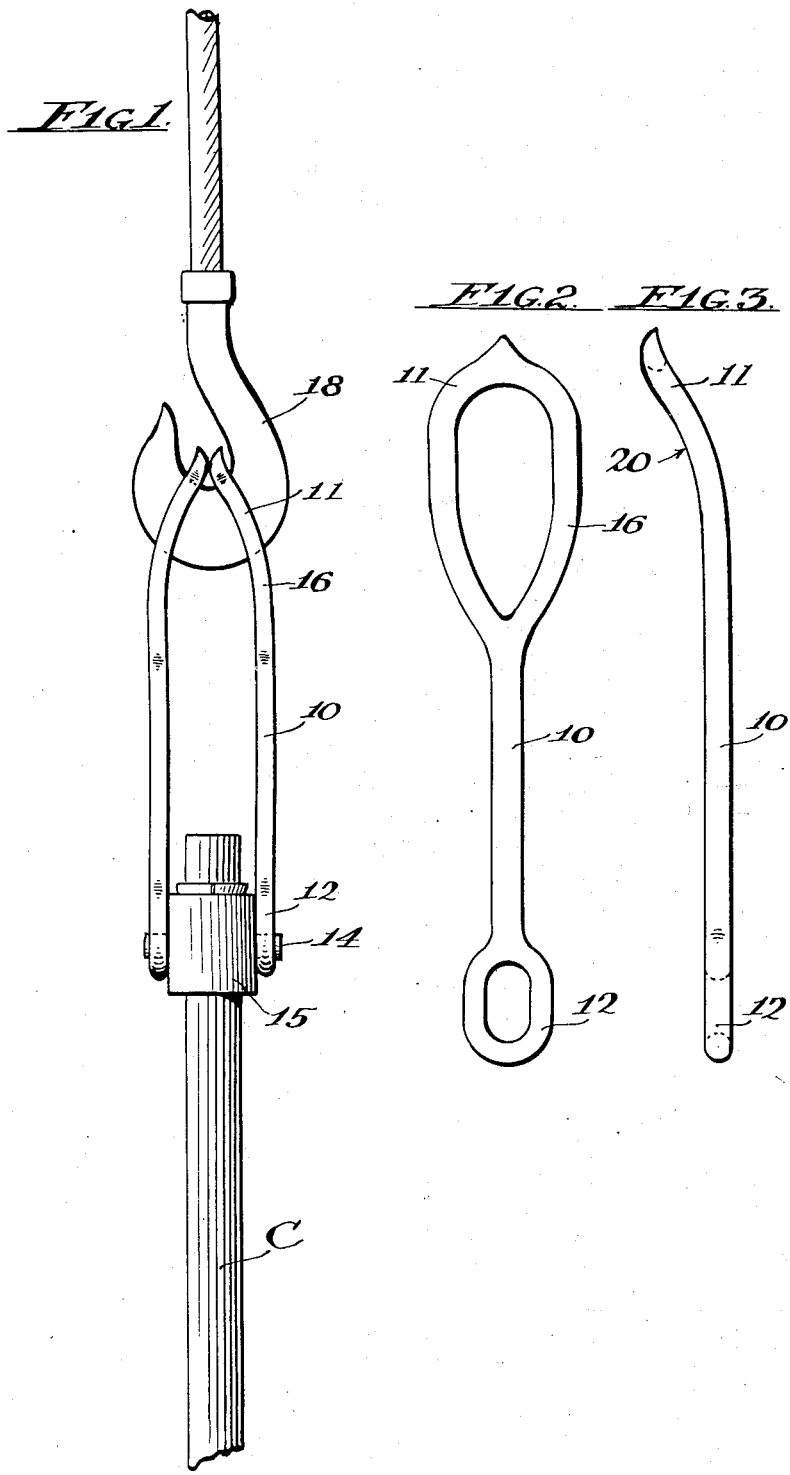
INVENTOR.
JAMES G. WHITE.
ATTORNEY.

Patented Oct. 28, 1930

1,779,895

UNITED STATES PATENT OFFICE

JAMES G. WHITE, OF LONG BEACH, CALIFORNIA

ELEVATOR LINK

Application filed May 8, 1928. Serial No. 276,183.

This invention relates to elevator links of the type adapted especially for service in the oil fields. As is well understood, in the raising and lowering of drill pipe and casing, an elevator or clamp is attached thereto and links are provided to connect the elevator with a hoisting hook. These links are of the open loop type and have been formed by welding at the top, and necessarily have been of low carbon steel due to the difficulties of welding high carbon steel. Moreover, when setting drill pipe or casing on the floor of the derrick, it often happens that the engine does not stop immediately, which allows the elevator to slide down the pipe or casing and as a consequence jams the end of said pipe or casing or the coupling thereon up through the openings in the links thus springing the latter. Repeated action of this character, that is the springing open and subsequent closing, naturally weakens the links and soon brings about fatigue of the low carbon steel especially at the weld. Further, the weights and strains of long strings of casing which are being set nowadays, and which are steadily increasing, are requiring stronger links in general. For these purposes, such links as have been just described are not adequate, due to the low tensile strength of the low carbon steel required to permit welding.

If larger links are employed in order to furnish the additional strength they are too awkward and cumbersome. Thus, in order to keep down the size of the links, a steel of higher tensile strength must be employed, such as an alloy steel or a steel of higher carbon content than used heretofore, the link being formed without welds. To make such a link of the usual shape and size, requires forging which can be accomplished by splitting the billet and finishing with hand tools, but this is costly.

All of these difficulties are overcome by the present invention, the objects of which are to provide a weldless elevator link of ample strength and small size, to provide a link of material of high tensile strength, to provide a link which will reduce handwork to a minimum, and which may be made under a steam hammer or the like by the use of forming dies.

Briefly, the invention resides in a weldless elevator link made from a steel billet of high tensile strength, and having its middle portion in the form of a single bar, each end having a relatively small opening formed therein, one opening being in the form of an eye to receive a hook on the elevator, and the other end being in the form of a loop to receive the hoisting hook.

In the accompanying drawings wherein one embodiment of the invention is disclosed by way of illustration;

Fig. 1, shows a pair of the present links as employed upon a hoisting hook to handle a casing.

Fig. 2, is a face view of one of the links per se.

Fig. 3, is an edge view thereof.

As shown, the link itself is very simple, comprising merely a bar or shank 10 having an eye 12 formed on its lower end to receive a hook 14 of an elevator 15, and having on its upper end a loop 16 shaped to pass over the hoisting hook 18, the upper portion of the loop being curved at 20 as usual to properly position a pair of the links on the hook when a casing —C— or drill pipe or the like is being handled.

The link is formed from a steel billet or other suitable metal of high tensile strength, forming dies being used in connection with a steam hammer or the like, to shape the eye 12 and the loop 16. The eye 12 need be only of sufficient size to easily accommodate a hook 14 of the elevator, and the loop 16 need be only large enough to be engaged with and disengaged from the hoisting hook conveniently. In view of these small sizes, forming dies may be readily employed and the work readily done under a steam hammer. Thus only a small amount of hand work is necessary, and yet an extremely satisfactory tool of ample strength and long life is produced at a comparatively low cost.

While the structure is very simple, nevertheless it possesses great advantages, and, in addition to its strength and long life, it presents the further highly satisfactory feature in that no opening is provided which is large enough for the end of a drill pipe to poke through and thereby strain the link. The single bar with its small eye and loop entirely prevents this possibility. Wherefore, unnecessary strains and the development of localized fatigue points are avoided.

I claim:

1. As an article of manufacture, an elevator link for use in pulling well tubing, tool rods and the like from deep wells shaped from a billet of steel and having an elongated intermediate shank of bar configuration, a relatively small elongated loop at one end thereof and a somewhat smaller narrow loop at the opposite end, the loop end of said link being curved in a manner to extend partially across the end of the well tubing, tool rod or the like being pulled.

2. As an article of manufacture, an elevator link for use in pulling well tubing, tool rods and the like from deep wells which comprises a unitary stamping shaped from a billet of steel, said stamping having an elongated central portion of bar formation, a relatively small eye at one end thereof, and a narrow loop at the opposite end thereof, the dimensions of said eye and loop being such as to prevent passage of well tubing, tool rods or the like therethrough whereby distortion and straining of the link is obviated.

In testimony whereof I affix my signature.

JAMES G. WHITE.